April 5, 1966 H. A. STOVER 3,245,079
A.D.F. RECEIVER

Filed Nov. 12, 1963 2 Sheets-Sheet 2

$\beta = K \cos \psi$
$\alpha = K \sin \psi$

INVENTOR.
HARRIS A. STOVER

BY
Moody & Anderson
AGENTS 3,245,079
A.D.F. RECEIVER
Harris A. Stover, Cedar Rapids, Iowa, assignor to Collins Radio Company, Cedar Rapids, Iowa, a corporation of Iowa
Filed Nov. 12, 1963, Ser. No. 322,938
9 Claims. (Cl. 343—113)

This invention relates generally to radio direction finding and more particularly to an improved direction finding receiver system of a type which functions by comparing the time of arrival (phase) of a transmitting signal at multiple antennas displayed in space.

Radio direction finders currently in use employ loop and goniometer techniques at low frequencies and rhombic antenna systems at very high frequencies. It is known that these systems are difficult to apply in the high frequency range and the present invention has as an object therefor the provision of an automatic direction finding receiver which is applicable throughout low, high, and very high frequency bands and is particularly advantageous for high frequency operation where difficulties are encountered with the systems currently in use.

A further object of the present invention is the provision of an A.D.F. system utilizing a fixed antenna geometry and wherein the employment of mechanically moving parts may be minimized or eliminated.

The present invention is featured in a unique phase modulation and demodulation technique whereby multiple channels of phase information are simultaneously carried through a single receiving channel employing pairs of space displaced receiving antennas and means by which the outputs from the antennas of each pair are alternately switched to a common receiver input at a rate determined by receiver generated tones and, wherein multiple phasing information from pairs of antennas is carried through the receiver as phase modulation at different modulation frequencies and after detection the phasing information is converted to a single frequency. The present invention accordingly develops first and second output signals at a common frequency, each of which carries amplitude and sensing information defined by an associated pair of fixed receiving antennas wherein the combination of such phasing information is definitive of the A.D.F. bearing.

These and other objects and features of the present invention will become apparent upon reading the following description in conjunction with the accompanying drawings in which:

FIGURE 5 shows further circuitry for utilizing the output signals.

As above mentioned, the present invention provides an A.D.F. system which functions by comparing the time of arrival, and thus the phase of a particular transmitted signal, at the various antennas which are displaced in space and which are fixed in a particular geometry. In the particular embodiment to be described, four such antennas will be utilized, it being understood that the teachings of the invention would permit obvious extensions to other numbers of antennas.

Figure 1:
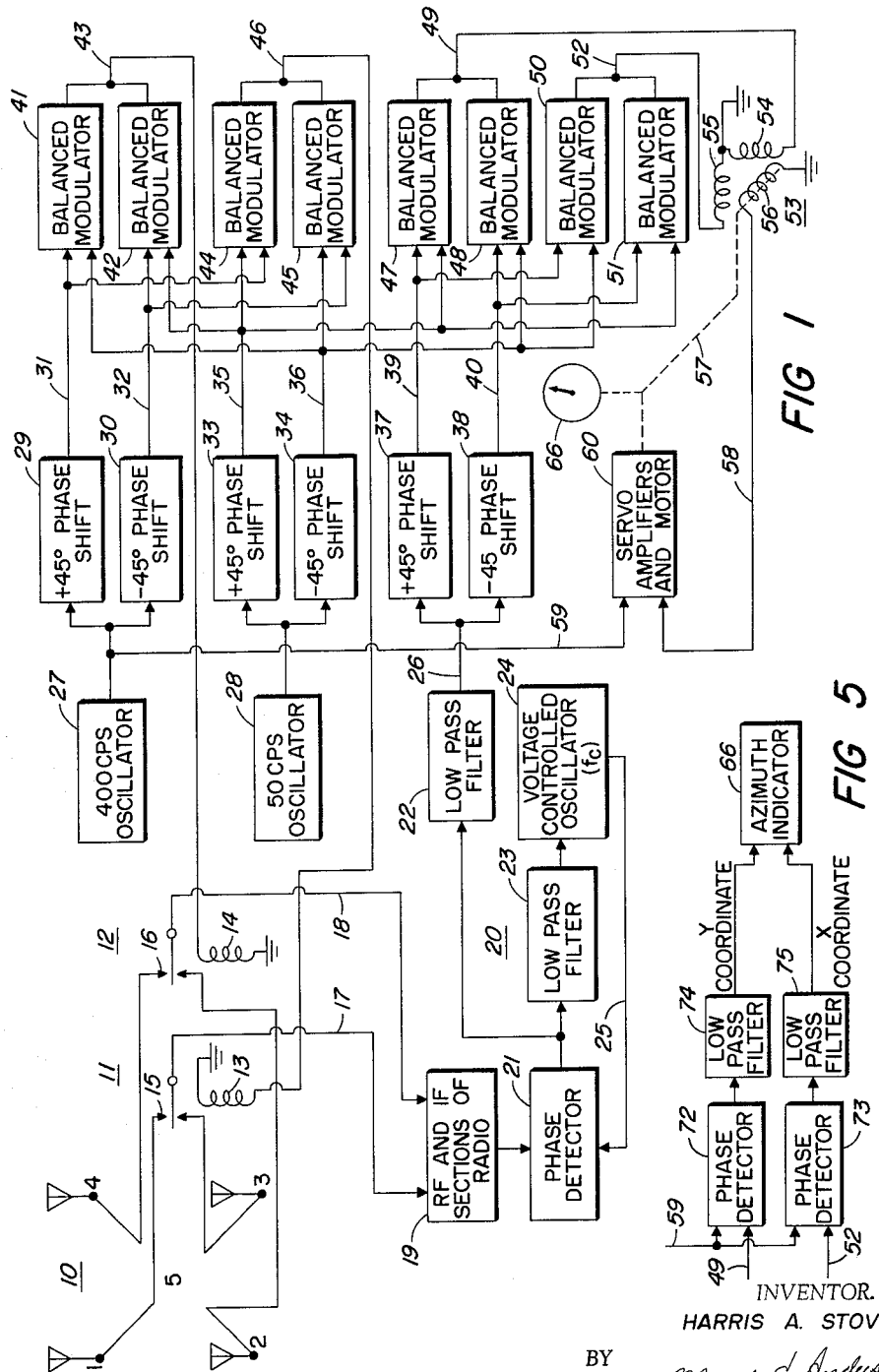
FIGURE 1 is a functional block diagram of an embodiment of the invention.

With reference to FIGURE 1, let it be assumed that the receiving system employs four antennas arranged in a fixed geometry in the corners of a square. Such an antenna arrangement 10 as shown in FIGURE 1, might then be comprised of antennas 1, 2, 3 and 4. The antenna geometry defines a definite phase relationship among the signals picked up by the four antennas for each direction of signal arrival. Thus, if the spacing between the antennas is sufficiently small (for example, considerably less than ½ wave length at the operating carrier frequency) no ambiguity would exist and there would be a one-to-one correspondence between particular phase relationships and particular direction of signal arrival.

The present invention exploits the relationship between received signal phasing and the antenna geometry to produce automatic indication of the direction of signal arrival.

The embodiment of FIGURE 1 employs antenna switching means 11 and 12 in association with each of the diagonally opposed antennas in the antenna system 10 by means of which the output from antennas 1 and 3 may be alternately switched through switch contact 15 as a first input 17 to the receiver front end section 19. Now, if switch 11 rapidly switches the receiver 17 between antennas 1 and 3, the received input 17 will be a phase modulated signal unless the direction of arrival of the signal is perpendicular to the base line between antennas 1 and 3. The phase shift of the received signal, as picked up by antennas 1 and 3, is symmetrical about the phase that an antenna placed at position 5 in the center of the configuration would have. When the direction of arrival of the transmitted signal is perpendicular to the base line between antennas 1 and 3, the average phase is always the phase that an antenna at position 5 would have. As further evidenced from the geometry of the antenna system, the amount of phase shift between signals received by antennas 1 and 3 is proportional to the sine of the angle between the direction of arrival of a transmitted signal and the perpendicular bisector of the base line between antennas 1 and 3. The phase of the modulation produced (that is, the relative phase shift) is reversed as the direction of signal arrival changes to the other side of the perpendicular bisector of the base line, and thus a sinusoidal relationship as concerns phase shift between the antenna pair is defined.

A similar relationship exists for antennas 2 and 4 in conjunction with switch 12 such that a second receiver input 18 is developed from a pair of antennas whose base line is perpendicular to that of antennas 1 and 3. Thus, rapid switching of switches 11 and 12 produces phase modulated signals at the outputs 17 and 18 of the switches which are symmetrical about the phase of a transmitted signal that would be picked up by an antenna at point 5 in the center of the antenna geometry. The outputs 17 and 18 from the switches 11 and 12 are then seen to be carrier signals as received between antenna pairs further phase-modulated at rates determined by the operation of switches 11 and 12 and with phase deviation dependent upon the direction of arrival of the carrier with respect to the associated antenna pairs. Demodulating techniques, to be further described, operate on the double phase shifted signal developed within the receiver front end section 19 to transform the dual phase information to first and second bearing indicative signals at a common frequency.

Description and operating characteristics of the circuitry of the present invention, which utilizes the outputs 17 and 18 from antenna switches 11 and 12, might best begin with a consideration of the development of switching tones to which the antenna switches 11 and 12 are respectively responsive. For this purpose the invention includes a first oscillator 27 which, in the embodiment to be described, might be a 400 c.p.s. oscillator. A second oscillator 28 provides a 50 c.p.s. output. The output from oscillator 27 is applied through phase shifters 29 and 30 to produce outputs 31 and 32 which respectively lead and lag the phase of oscillator 27 by 45°. The output from oscillator 28 is similarly applied through phase shifters 33 and 34 to produce outputs 35 and 36 which respectively lead and lag the output of oscillator 28 by 45°. The output 31 from phase shifter 29 is applied as input to balanced modulators 41 and 44. The output 32 from phase shifter 30 is applied to balanced modulators 42 and 45. The output 35 from phase shifter 33 is applied as a second input to balanced modulators 42 and 44. The output 36 from phase shifter 34 is applied as a second input to balanced modulators 41 and 45. The outputs from balanced modulators 41 and 42 are combined to produce an output 43 which is connected to the operating solenoid of antenna switch 12. The outputs from balanced modulators 44 and 45 are combined to produce output 46 which is connected to the operating solenoid 13 of antenna switch 11.

The above described circuitry provides outputs 43 and 46 as two tones, one of which is the sum of the operating frequencies of oscillators 27 and 28, and the other of which is the difference between the operating frequencies of oscillators 27 and 28. The manner in which these tones are developed may be seen from the following mathematical considerations of the particular phase shifting and demodulation techniques illustrated.

For the purpose of discussion, let it be assumed, that cosine waves are developed within the oscillators 27 and 28. We will assume that the balance modulators 41, 42, 44 and 45 are product devices. Defining the 400 c.p.s. output from oscillator 27 as $\omega_1 t$ and that from 50 c.p.s. oscillator 28 as $\omega_2 t$, the outputs from the balanced modulators may be defined in terms of the following trigonometric identity:

(1) $\cos A \cos B = 1/2(A+B) + 1/2 \cos (A-B)$

Inputs 31 and 36 to balanced modulator 41 become the "A" and "B" terms of (1).

Letting $\omega_1 t$ and $\omega_2 t$ represent 400 c.p.s. and 50 c.p.s. outputs from oscillators 27 and 28, the output from modulator 41 then becomes:

(2) $1/2 \cos [(\omega_1 t+45°)+(\omega_2 t-45°)] + 1/2 \cos [(\omega_1 t+45°)-(\omega_2 t-45°)]$ Output (2) simplifies to:

(3) $1/2 \cos (\omega_1 t+\omega_2 t) + 1/2 \cos (\omega_1 t-\omega_2 t+90°)$

The output from balanced modulator 42 may be expressed as the product of the inputs 32 and 35 and expanded according to (1) as:

(4) $1/2 \cos [(\omega_1 t-45°)+(\omega_2 t+45°)] + 1/2[(\omega_1 t-45°)-(\omega_2 t+45°)]$ Output (4) simplifies to:

(5) $1/2 \cos (\omega_1 t+\omega_2 t) + 1/2 \cos (\omega_1 t-\omega_2 t-90°)$

The outputs of modulators 41 and 42 are added to produce output 43 which becomes the sum of Expressions 3 and 5 and is expressed as:

(6) $\cos (\omega_1 t+\omega_2 t)$

The second terms of Expressions 3 and 5 represent equal and opposite values and thus drop from the combined Expression 6. Expression 6 then defines the combined output 43 from modulators 41 and 42 as a 450 c.p.s. cosine wave which is derived from the 400 c.p.s. oscillator 27 and the 50 c.p.s. oscillator 28.

The combined output from balanced modulators 44 and 45 may be similarly derived. The output from balanced modulator 44 becomes:

(7) $1/2 \cos [(\omega_1 t+45°)+(\omega_2 t+45°)] + 1/2 \cos [(\omega_1 t+45°)-(\omega_2 t+45°)]$ Expression 7 simplifies to:

(8) $1/2 \cos (\omega_1 t+\omega_1 t+90°) + 1/2 \cos (\omega_1 t-\omega_2 t)$

The output from balanced modulator 45 becomes:

(9) $1/2 \cos [\omega_1 t-45°)+(\omega_2 t-45°)] + 1/2 \cos [(\omega_1 t-45°)-(\omega_2 t-45°)]$ Output (9) simplifies to:

(10) $1/2 \cos (\omega_1 t+\omega_2 t-90°) + 1/2 \cos (\omega_1 t-\omega_2 t)$

The outputs of modulators 44 and 45 are added to produce output 46 which becomes the sum of (8) and (9) and is expressed as:

(11) $\cos (\omega_1 t-\omega_2 t)$

The first terms of Expressions 8 and 10 represent equal and opposite values and thus drop from the combined Expression 11.

Expression 11 then defines the combined output 46 of balanced modulators 44 and 45 as a 350 c.p.s. cosine wave which is derived from the 400 c.p.s. oscillator 27 and the 50 c.p.s. oscillator 28.

The 450 c.p.s. cosine wave at output 43 is used to synchronously opearte the antenna switch 12 and the 350 c.p.s. cosine wave at output 46 is used to synchronously operate antenna switch 11. Thus, when the outputs 17 and 18 from antenna switches 11 and 12 are combined in the receiver input block 19, the result is a carrier frequency wave having the frequency and phase of a wave that would be picked up by an antenna at the center point 5 of the antenna geometry. This carrier wave is phase modulated at two frequencies 450 c.p.s. and 350 c.p.s. The deviation of the phase modulations is dependent upon the direction of arrival of the signal. Likewise, the sense (+ or −) of the modulation is dependent upon the particular side of the perpendicular bisector of the base line between an antenna pair from which the signal arrives. Stated differently, the phase modulation at 450 c.p.s. is proportional to the sine of the single $\psi$ between the direction of arrival of the signal and the perpendicular bisector of the base line between antennas 2 and 4, and the phase modulation at 350 c.p.s. is proportional to the sine of the angle between the direction of arrival of a signal and the perpendicular bisector of the base line between antennas 1 and 3. From the geometry of the system, it is apparent that the phase modulations at 450 c.p.s and 350 c.p.s are proportional to sine $\psi$ and cos $\psi$, respectively. This composite signal, as present in the radio front end section 19, is applied to a synchronous detector which detects the phase modulation induced by antenna switching. The synchronous detector is comprised of a phase detector 21 which, in conjunction with a low pass filter 23 and voltage controlled oscillator 24, forms a phase locked loop by means of feedback line 25 between oscillator 24 and phase detector 21. The output from phase detector 21 is carried through low pass filter 22 to remove undesired components to provide an output 26, comprised of two tones at 350 c.p.s. and 450 c.p.s. whose amplitude and sense (+ or −) are dependent upon the direction of arrival of a transmitted signal with respect to the antenna geometry. Both of these two tones are applied to further phase shifters 37 and 38 which introduce leading and lagging 45° phase shifts, respectively.

Letting $\alpha$ represent the amplitude and sensing (+ or −) of the 450 c.p.s. tone out of phase detector 21 and let $\beta$ represent the amplitude and sensing (+ or −) of the 350 c.p.s. tone out of phase detector 21, we may now consider the mathematical relationships by which phase shifters 37 and 38 together with further balanced modulators 47, 48, 50 and 51 arrive at first and second output signals which collectively define the A.D.F. bearing. As above, let the 450 c.p.s. tone be defined as $\omega_1 t+\omega_2 t$ and the 350 c.p.s. tone be defined as $\omega_1 t-\omega_2 t$.

The output 39 from phase shifter 37 may then be expressed as the sum of two phase shifted tones:

(12) $\alpha \cos (\omega_1 t+\omega_2 t+45°) + \beta \cos (\omega_1 t-\omega_2 t+45°)$ The output from balanced modulator 47 is the product of cos $(\omega_2 t+45°)$ and Expression 12 and, in terms of identity (1), may be expressed as:

(13) $1/2\ \alpha\ \cos\ [(\omega_1 t+\omega_2 t+45°)+(\omega_2 t+45°)]$
$+1/2\ \alpha\ \cos\ [(\omega_1 t+\omega_2 t+45°)-(\omega_2 t+45°)]$
$+1/2\ \beta\ \cos\ [(\omega_1 t-\omega_2 t+45°)-(\omega_2 t+45°)]$
$+1/2\ \beta\ \cos\ [(\omega_1 t-\omega_2 t+45°)-(\omega_2 t+45°)]$ Expression 13 simplifies to:

(14) $1/2\ \alpha\ \cos\ [\omega_1 t+2\omega_2 t+90°]+1/2\ \alpha\ \cos\ \omega_1 t$
$-1/2\ \beta\ \cos\ [\omega_1 t+90°]+1/2\ \beta\ \cos\ [\omega_1 t-2\omega_2 t]$ The output 40 from phase shifter 38 is comprised of the phase shifted tones,

(15) $\alpha\ \cos\ (\omega_1 t+\omega_2 t-45°)+\beta\ \cos\ (\omega_1 t-\omega_2 t-45°)$ The output from balanced modulator 48 is the product of cos $(\omega_2 t-45°)$ and Expression 15 and, in terms of identity (1), may be expressed as:

(16) $1/2\ \alpha\ \cos\ [(\omega_1 t+\omega_2 t-45°)+(\omega_2 t-45°)]$
$+1/2\ \alpha\ \cos\ [(\omega_1 t+\omega_2 t-45°)-(\omega_2 t-45°)]$
$-1/2\ \beta\ \cos\ [(\omega_1 t-\omega_2 t-45°)+(\omega_2 t-45°)]$
$+1/2\ \beta\ \cos\ [(\omega_1 t-\omega_2 t-45°)-(\omega_2 t-45°)]$ Expression 16 simplifies to:

(17) $1/2\ \alpha\ \cos\ [\omega_1 t+2\omega_2 t-90°]+1/2\ \alpha\ \cos\ \omega_1 t$
$+1/2\ \beta\ \cos\ [\omega_1 t-90°]+1/2\ \beta\ \cos\ [\omega_1 t-2\omega_2 t]$ The outputs from balanced modulators 47 and 48 are added to produce an output 49 which becomes the sum of Expressions 14 and 17 and is expressed as:

(18) $\alpha\ \cos\ \omega_1 t+\beta\ \cos\ (\omega_1 t-2\omega_2 t)$

In terms of the values illustrated for $\omega_1$ and $\omega_2$ Expression 18 becomes:

(19) $\alpha\ \cos\ 400t+\beta\ \cos\ 300t$

By a similar analysis the expression for the combined output 52 of balanced modulators 50 and 51 becomes:

(20) $\alpha\ \cos\ (\omega_1 t+2\omega_2 t)+\beta\ \cos\ \omega_1 t$

In terms of the values illustrated for $\omega_1$ and $\omega_2$, Expression 20 becomes:

(21) $\alpha\ \cos\ 500t+\beta\ \cos\ 400t$

The output 49, as defined in Expression 19 is seen to be comprised of two cosine waves, one at 400 c.p.s. which contains the amplitude and sensing information of the phase detector 21 output at 450 c.p.s., and one at 300 c.p.s. which contains the amplitude and sensing information of the phase detector 21 output at 350 c.p.s.

The output 52, as defined by Expression 21, is seen to be comprised of two cosine waves, one at 500 c.p.s. which contains the amplitude and sensing information of the phase detector 21 output at 450 c.p.s. and one at 400 c.p.s. which contains the amplitude and sensing information of the phase detector 21 output at 350 c.p.s.

Considering the two outputs 49 and 52, as expressed in (19) and (21), it is seen that each includes a 400 c.p.s. component. The 400 c.p.s. component of Expression 19 carries the amplitude and sensing information from antennas 2 and 4 while the 400 c.p.s. component of Expression 21 carries the amplitude and sensing information from antennas 1 and 3. Techniques may then be employed to use the 400 c.p.s. components of the outputs to the exclusion of the 300 and 500 c.p.s. components to define A.D.F. bearing. It is noted that the 400 c.p.s. oscillator and the 50 c.p.s. oscillator 35 establish switching rates in accordance with the sum and difference therebetween; and that ensuing circuitry converts the amplitude and sensing information from the two switching channels to a common 400 c.p.s. tone. The phase and frequency relationships of the 400 c.p.s. oscillator were carried all of the way through the system. Thus the outputs 49 and 52 might be applied to stator windings 54 and 55 of resolver 53. The rotor 56 of resolver 53 may supply an error input 58 to a servo amplifier 60 which utilizes the output from the 400 c.p.s. oscillator 27 as the servo reference frequency. Rotor 56 of resolver 53 will thus be positioned in accordance with a servo rotor shaft position 57 to a null and the shaft position will be indicative of the direction of arrival of the signal with respect to the antenna geometry.

Figure 4:
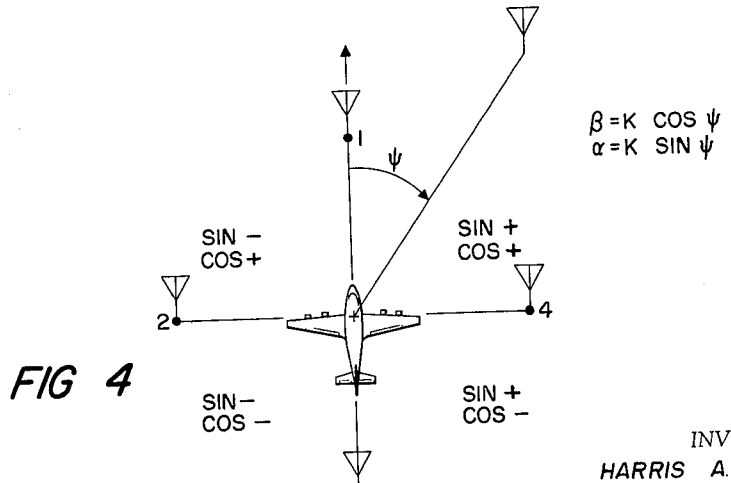
FIGURE 4 is a diagrammatic representation of the antenna geometry and bearing determining principle involved.

The manner in which the outputs 49 and 52 may be utilized with an electromechanical resolver to arrive at an A.D.F. bearing configuration is apparent with reference to FIGURE 4. The amplitude and sensing characteristics of the 400 cycle components of these outputs have been defined as $\alpha$ and $\beta$ respectively. FIGURE 4 illustrates the antenna geometry as it may be oriented with respect to the axes of an aircraft wherein the base line between antennas 1 and 3 coincides with the longitudinal axis of the aircraft and the angle $\psi$ represents the A.D.F. bearing as measured between the heading of the aircraft and the transmitting station. The $\alpha$ amplitude and sensing characteristic associated with antennas 2 and 4 is seen from the geometry of the system to be defined by $K\sin\psi$, wherein K is an amplitude factor related to the frequency and the spacing between antennas since this is the amplitude and sense of the phase shift due to difference in signal arrival time among the antennas. The $\beta$ amplitude and sensing factor associated with the outputs from antennas 1 and 3 is defined as $K\cos\psi$. It is apparent then, from the orientation depicted in FIGURE 4, that the factors $\beta$ and $\alpha$ follow the cosine and sine functions of the A.D.F. bearing $\psi$ and thus carry the sensing ($+$ or $-$) in accordance with trigonometric convention as related to the four quadrants from which the received signal may emanate.

The outputs 49 and 52, as expressed in Expressions 19 and 21 are thus seen to be of sinusoidal amplitude variation and sensing in accordance with trigonometric convention such that they represent the rectangular coordinates of a vector, the angle of which is the A.D.F. bearing $\psi$. Thus, these two outputs are of a form directly applicable to resolving techniques for bearing determination. An electromechanical resolver may be used to arrive at A.D.F. bearing by converting the rectangular coordinate input information provided by outputs (19) and (21) to polar form.

The manner in which the outputs (19) and (21) may be used to drive A.D.F. bearing $\psi$, using an electromechanical resolver, is apparent from the following consideration of the transfer characteristics of an electromechanical resolver: If $R_1$ and $R_2$ are the respective rotor voltages in a resolver and $S_1$ and $S_2$ are the respective stator voltages, the following relationships or transfer characteristics apply where $\theta$ is the angle between the resolver rotor and the stator windings as measured from a predetermined reference position.

$$S_1 = R_1 \sin\theta + R_2 \cos\theta$$
$$S_2 = R_1 \cos\theta - R_2 \sin\theta$$
$$R_1 = S_1 \sin\theta + S_2 \cos\theta$$
$$R_2 = S_1 \cos\theta - S_2 \sin\theta$$

For the embodiment, $$S_1 = \alpha\cos 400t + \beta\cos 300t$$
$$S_2 = \beta\cos 400t + \alpha\cos 500t$$

It is noted that one of the stator windings of resolver 53 will have applied thereto a 300 c.p.s. signal component in addition to the desired 400 c.p.s. signal and the other stator of resolver 53 will have a 500 c.p.s. signal applied thereto in addition to the desired 400 c.p.s. signal. The 300 c.p.s. and 500 c.p.s. signal differ sufficiently from the desired 400 c.p.s. signal such that the servo cannot respond to them.

Substituting the 400 c.p.s. components of $S_1$ and $S_2$ in that for $R_2$:

$$R_2 = \alpha\cos 400t \cos\theta - \beta\cos 400t \sin\theta$$

From the antenna geometry:

$$\alpha = K \sin \psi \text{ and } \beta = K \cos \psi$$

Therefore:

$$R_2 = K \sin \psi \cos 400t \cos \theta - K \cos \psi \cos 400t \sin \theta$$

For $R_2$ null:

$$K \sin \psi \cos 400t \cos \theta = K \cos \psi \cos 400t \sin \theta$$
$$\sin \psi \cos \theta = \cos \psi \sin \theta$$

The above expression is satisfied when $\psi = \theta$
Therefore, under null condition, the resolver rotor angle is equal to $\psi$ the A.D.F. bearing angle.

Figure 2:
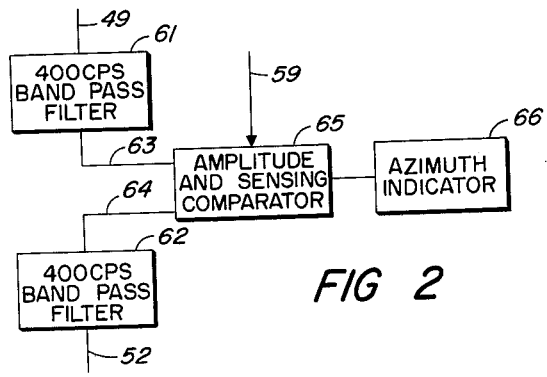
FIGURE 2 is a functional diagram of a generalized output signal utilization circuitry which might be employed with the embodiment of FIGURE 1.

The 400 cycle component of the output signals 49 and 52 are seen to be signals carrying an amplitude and sensing (+ or —) which corresponds to the rectangular coordinates of the received signal vector as it is resolved on the base lines between the antenna pairs. It is contemplated, therefore, that these two signals may be utilized with circuitry other than a resolver and servoing approach to develop an indication of A.D.F. bearing. As concerns the resolver technique illustrated in the embodiment of FIGURE 1, the 300 c.p.s. and 500 c.p.s. components of the output signals 49 and 52 are ineffective as concerns the resolving process. A more generalized output bearing determination is that illustrated in FIGURE 2 wherein the composite output signals 49 and 52 are passed through 400 c.p.s. bandpass filters 61 and 62 respectively to develop filter outputs 63 and 64 and corresponding only to the common frequency component. The 400 c.p.s. components, each of which carries the amplitude and sensing information associated with the signal received by one of the antenna pairs, may then be applied along with the 400 c.p.s. reference signal 59 to an amplitude and sensing comparator 65 which might be other than the resolver illustrated in the embodiment of FIGURE 1. An azimuth indicator 66 is responsive to the comparator 65 to display the A.D.F. bearing. The comparator 65 of FIGURE 2 might, for example, be comprised of a solid state resolving circuitry in lieu of electromechanical resolver discussed above. In general, the function of the amplitude comparator 65 is that of an analogue computation which, in response to input signals defining the rectangular coordinates defining given vector, includes means to compute therefrom the resultant of the vector in polar form, wherein the angle of the resultant vector is the desired A.D.F. bearing.

A further expedient for utilizing the output signals 49 and 52 for azimuth readout is indicated in FIGURE 5. The system of FIGURE 5 develops D.C. signals corresponding to the X and Y coordinates of the azimuth vector which may be applied to the azimuth indicator 66 for bearing display. For this purpose output signal 49 is applied with the 400 cycle reference signal 59 to a phase detector 72. The output from phase detector 72 is applied through a low pass filter 74 the output of which is a D.C. voltage corresponding to the Y coordinate of the azimuth vector. Similarly output signal 52 is applied along with the 400 c.p.s. reference 59 to a phase detector 73. The output from phase detector 73 is applied to a low pass filter 75 to develop a D.C. voltage output corresponding to the X coordinate of the azimuth vector. The azimuth indicator 66 for the readout embodiment of FIGURE 5 might then be a cathode ray indicator wherein the X and Y coordinate signals would be applied to the respective horizontal and vertical deflection coils or plates.

The operation of the readout embodiment of FIGURE 5 is apparent from the following mathematical considerations:

Input 52 has been defined as $\alpha \cos 500t + \beta \cos 400t$.
Phase detector 73 multiplies input 52 by the reference cos $400t$. The output from phase detector 73 then becomes:

$$\cos 400t(\alpha \cos 500t + \beta \cos 400t)$$
$$= \frac{\alpha}{2} \cos 900t + \frac{\alpha}{2} \cos 100t + \frac{\beta}{2} + \frac{\beta}{2} \cos 800t$$

After low pass filtering, the above becomes $\beta/2$ which contains both sense and magnitude.

Input 49 has been defined as $\alpha \cos 400t + \beta \cos 300t$. The output of phase detector 72 is the product of input 49 and the reference 59 defined as cos $400t$ and may be expressed as:

$$\cos 400t(\alpha \cos 400t + \beta \cos 300t)$$
$$= \frac{\alpha}{2} + \frac{\alpha}{2} \cos 800t + \frac{\beta}{2} \cos 100t + \frac{\beta}{2} \cos 700t$$

After low pass filtering, the above becomes $\alpha/2$ which contains both magnitude and sense.

Figure 3:
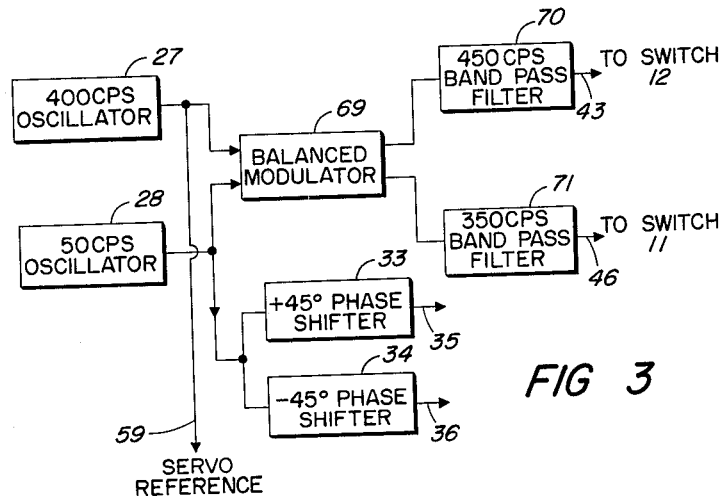
FIGURE 3 is a functional diagram of an alternate tone generation scheme.

Modifications in the tone development circuitry of FIGURE 1 might be employed without departing from the teachings of the invention. FIGURE 3 illustrates one such modification concerned with the development of the antenna switching tones which were discussed as being the sum and difference respectively of the frequencies of oscillators 27 and 28. With reference to FIGURE 3, the outputs from oscillators 27 and 28 might, for example, be applied as inputs to a balanced modulator 69 and the output from modulator 69 applied through selective bandpass filters 70 and 71 to develop the switching tones 43 and 46. The embodiment of FIGURE 1, in this regard, is considered preferred since it permits a more exacting control of phase throughout the system. The modification of FIGURE 3 is operational but might necessitate additional phase control requirements such as, for example, within the bandpass filters 70 and 71. As previously discussed, the technique of converting the desired information from two different tones to a common tone at the output necessitates that the phase relationships be precisely maintained throughout the system. Such relationships would, in all likelihood, be better maintained in the FIGURE 1 embodiment.

The invention is thus seen to provide an A.D.F. system which functions because of the difference in time of arrival of a signal at a multiplicity of fixed antennas. The required information was transmitted simultaneously through the same radio channel. The information from antennas 1 and 3 was carried as phase modulation at a first switching frequency and the information from antennas 2 and 4 was carried as phase modulation at a second switching frequency. Following detection, all of the information was converted to amplitude and sensing information at a single frequency so as to be readily adaptable to readout techniques.

Although this invention has been described with respect to a particular embodiment thereof, it is not to be so limited as changes may be made which fall within the scope of the invention as defined by the appended claims.

I claim:
1. Means for determining the direction of arrival of a transmitted wave in space at a receiving station comprising first and second pairs of space-separated receiving antennas the base lines between pairs of which are mutually perpendicular, said first pair of antennas connected to first switching means, said second pair of antennas connected to second switching means, each of said switching means being adapted to alternately connect the outputs from the antennas of the associated one of said antenna pairs to the input of a radio receiver, a first oscillator generating a signal $\omega_1 t$, a second oscillator generating a signal $\omega_2 t$, means responsive to said first and second oscillator to develop tones defined as $\omega_1 t+\omega_2 t$ and $\omega_1 t-\omega_2 t$, said first switching means being responsive to the tone $$\omega_1 t+\omega_2 t$$

to alternately switch the output from said first pair of antennas to said receiver input at a rate determined thereby, said second switching means being responsive to the tone $\omega_1 t-\omega_2 t$ to alternately switch the output from said second pair of antennas to said receiver input at a rate determined thereby, synchronous demodulating means receiving inputs from said first and second switching means and developing therefrom an output comprised of first and second output tones $\omega_1 t+\omega_2 t$ and $\omega_1 t-\omega_2 t$ respectively, said first and second output tones having an amplitude and carrying algebraic sign in accordance with the phase modulation of the output from said first and second switching means, respectively, means receiving the output from said synchronous demodulating means and converting the amplitude and sensing of each of said first and second output tones to first and second output signals each of which includes a component carrying the amplitude and sensing characteristics of one of said first and second output tones on a further common tone $\omega_1$, whereby the common tone components of said first and second outputs are collectively definitive of the direction of arrival of a received wave with respect to the geometry of said antenna system.

2. A system as defined in claim 1 where said synchronous demodulated means comprises a phase detector, a low pass filter receiving output from said detector, a voltage controlled oscillator operated at a frequency equal to the carrier frequency of said received signal, the output from said low pass filter being applied as input control voltage to said voltage controlled oscillator, and the output of said oscillator connected as a second input to said phase detector, said first and second output tones being the output of said phase detector.

3. A sysem as defined in claim 1 further comprising amplitude and sensing comparison means receiving said first and second output signals and a reference signal $\omega_1 t$ and being adapted to develop the vector defined by said output signals, wherein the vector angle corresponds to the direction of arrival of said transmitted wave with respect to said aforedefined antenna geometry.

4. A system as defined in claim 1 wherein said first and second output signals are applied respectively to first and second stator elements of an electromechanical resolver, a rotor element of said resolver being connected as first input to a servo positioning means, the output from said $\omega_1 t$ oscillation generator being connected as a reference input to said servo positioning means, said servo positioning means including a motor the shaft of which is connected to and positions the rotor element of said resolver to a null position with respect to the stator elements thereof, whereby the angular relationship between the rotor and stator elements of said resolver is indicative of the direction of arrival of said transmitted wave with respect to said antenna geometry.

5. An automatic direction finding receiver for determining the relative bearing between a reference defined by receiving antenna geometry and the direction of arrival of a received signal comprising first and second pairs of space-separated receiving antennas the base lines between pairs of which are mutually perpendicular, first and second oscillators producing signals defined as $\omega_1 t$ and $\omega_2 t$, respectively, means receiving said $\omega_1 t$ and $\omega_2 t$ signals and generating first and second signals $\omega_1 t+\omega_2 t$ and $\omega_1 t-\omega_2 t$ respectively, first switching means receiving said $\omega_1 t+\omega_2 t$ signal and being responsive thereto to alternately switch the outputs from a first pair of said antennas to a receiver input channel at a rate determined thereby, second switching means receiving said $\omega_1 t-\omega_2 t$ signal and being responsive thereto to alternately switch the outputs from the other of said pair of antennas to said receiver input channel at a rate determined thereby, synchronous detection means receiving the outputs from said receiver input channel and developing in response thereto a composite output signal comprised of tones $\omega_1 t+\omega_2 t$ and $\omega_1 t-\omega_2 t$ respectively carrying amplitude and sensing characteristics corresponding to the phase shift characteristics of the outputs of said first and second antenna pairs, first and second phase shifting means receiving the output from said synchronous detector, said first and second phase shifting means producing outputs respectively leading and lagging the inputs thereto by 45°, first multiplying means multiplying the output of said first phase shifting means by $\omega_2 t+45°$, second multiplying means multiplying the output from said second phase shifting means by $\omega_2 t-45°$, means combining the outputs from said first and second multiplying means to produce a first output signal, third multiplying means multiplying the output of said first phase shifting means by $\omega_2 t-45°$, fourth multiplying means multiplying the output of said second phase shifting means by $\omega_2 t+45°$, means combining the outputs from said third and fourth multiplying means to produce a second output signal, output means responsive to the amplitude and sensing characteristics of said first and second output signals to develop therefrom the vector resultant of said first and second output signals the vector angle of which corresponds to the direction of arrival of said transmitted wave with respect to the aforedefined antenna geometry.

6. Means for determining the direction of arrival in space of a transmitted wave with respect to a receiving station comprising first and second pairs of space-separated receiving antennas the base lines between pairs of which are equal and mutually perpendicular, said base lines extending less than one-half wavelength at the carrier frequency of a received signal; comprising first and second switching means connected respectively to said first and second antenna pairs and being adapted to alternately switch the outputs from the antennas in the associated antenna pair to a common receiver input channel, phase demodulating means connected to said receiver input channel, and adapted to operate synchronously at the carrier frequency of said received signal, first and second oscillators producing outputs defined as $\omega_1 t$ and $\omega_2 t$, respectively, first phase shifting means receiving the outputs $\omega_1 t$ and $\omega_2 t$ and producing output signals respectively defined as $\omega_1 t+45°$, $\omega_1 t-45°$, $\omega_2 t+45°$ and $\omega_2 t-45°$, a first balance modulator receiving the signals defined as $\omega_1 t+45°$ and $\omega_2 t-45°$ as inputs thereto, a second balanced modulator receiving the signals defined as $\omega_1 t-45°$ and $\omega_2 t+45°$ as inputs thereto, means adding the outputs of said first and second balanced modulators to obtain a signal defined as $\omega_1 t+\omega_2 t$, a third balanced modulator receiving the signals defined as $\omega_1 t+45°$ and $\omega_2 t+45°$ as inputs thereto, a fourth balanced modulator receiving the signals defined as $\omega_1 t-45°$ and $\omega_2 t-45°$ as inputs thereto, means adding the outputs from said third and fourth balanced modulators to obtain a signal defined as $\omega_1 t-\omega_2 t$, means receiving said $\omega_1 t-\omega_2 t$ signal and being responsive thereto to effect operation of said first switching means at a corresponding rate, means receiving said $\omega_1 t-\omega_2 t$ signal and being responsive thereto to effect operation of said second switching means at a corresponding rate, second phase shifting means, means connecting the output from said phase demodulating means to said second phase shifting means for development of first and second output signals respectively leading and lagging said demodulating means output by 45°, a fifth balanced modulator receiving said first output of said second phase shifting means and said $\omega_2 t+45°$ signal as inputs thereto and producing an output corresponding to the product thereof, a sixth balanced modulator receiving the second output from said second phase shifting means and said $\omega_2 t-45°$ signal as inputs thereto and producing an output corresponding to the product thereof, means adding the outputs of said fifth and sixth balanced modulators and producing a first output signal, a seventh balanced modulator receiving the first output from said second phase shifting means and said $\omega_2 t - 45°$ signal and producing an output corresponding to the product thereof, an eighth balanced modulator receiving the second output from said phase shifting means and said $\omega_2 t + 45°$ signal and producing an output corresponding to the product thereof, means adding the outputs of said seventh and eighth balanced modulators to produce a second output signal, and bearing determining means receiving said first and second output signals and said $\omega_1 t$ signal and being responsive to the amplitudes and senses thereof to determine the bearing of the source of said transmitted wave with respect to said antenna geometry.

7. A system as defined in claim 6 wherein said bearing determining means comprises an electromechanical resolver having first and second stator windings respectively receiving said first and second output signals, a servo positioning means; said servo positioning means including motor means, servo amplifier receiving the output from a rotor winding of said resolver as a variable phase input signal thereto and said $\omega_1 t$ oscillator signal as a reference phase input signal thereto, said motor means including a shaft connected to and effecting rotating of said resolver rotor to a null position whereby the relative angle between said resolver rotor and stator windings is definitive of the direction of arrival of said transmitted wave with respect to said receiving antenna geometry.

8. A system as defined in claim 6 wherein said bearing determining means comprises first and second phase detectors each receiving said $\omega_1 t$ signal as a first input thereto and respectively receiving said first and second output signals as second inputs thereto, first and second low pass filtering means respectively receiving the outputs from said first and second phase detectors and producing D.C. voltage outputs the respective amplitudes and sensing of which are definitive of the rectangular coordinates of said bearing.

9. Signal demodulating means for converting first and second input signals of carrier frequency $f_c$ each respectively phase modulated at deviation rates determined by first and second tones $\omega_1 t + \omega_2 t$ and $\omega_1 t - \omega_2 t$ and each carrying information in the form of a discrete phase deviation to first and second output signals having a common frequency component $\omega_1 t$ and carrying amplitude and sensing characteristics $\alpha$ and $\beta$, respectively, $\alpha$ and $\beta$ corresponding respectively to the phase deviation and sensing of said input signals; comprising, synchronous demodulation means receiving said first and second input signals and developing therefrom first and second tones $\omega_1 t + \omega_2 t$ and $\omega_1 t - \omega_2 t$, respectively, means for generating a signal defined as $\omega_2 t$, first and second phase shifting means receiving said $\omega_2 t$ signal and developing therefrom output signals corresponding to $\omega_2 t + 45°$ and $\omega_2 t - 45°$ respectively, third and fourth phase shifting means receiving the output from said synchronous demodulation means, said third and fourth phase shifting means developing output signals respectively leading and lagging the inputs thereto by $45°$, a first balanced modulator receiving the outputs from said first and third phase shifting means as inputs thereto, a second balanced modulator receiving the outputs from said second and fourth phase shifting means as inputs thereto, means for adding the outputs from said first and second balanced modulators to develop said first output signal defined as $\alpha \cos \omega_1 t + \beta \cos (\omega_1 t - 2\omega_2 t)$, a third balanced modulator receiving outputs from said second and third phase shifting means as inputs thereto, a fourth balanced modulator receiving outputs from said first and fourth phase shifting means as inputs thereto, means for adding the outputs from said third and fourth balanced modulators to develop said second output signal defined as $\alpha \cos (\omega_1 t + 2\omega_2 t) + \beta \cos \omega_1 t$.

References Cited by the Examiner
UNITED STATES PATENTS
2,589,236  3/1952  Earp _____ 343—121

CHESTER L. JUSTUS, *Primary Examiner.*
R. E. BERGER, *Assistant Examiner.*